United States Patent
Yang et al.

(10) Patent No.: US 10,512,307 B2
(45) Date of Patent: Dec. 24, 2019

(54) ADHESIVE APPLICATOR

(71) Applicant: POU CHEN CORPORATION, Chang Hwa Hsien (TW)

(72) Inventors: Yu-Fong Yang, Chang Hwa Hsien (TW); Han-Cheng Chen, Taichung (TW)

(73) Assignee: POU CHEN CORPORATION, Chang Hwa Hsien (TW)

( * ) Notice: Subject to any disclaimer, the term of this patent is extended or adjusted under 35 U.S.C. 154(b) by 0 days.

(21) Appl. No.: 16/040,508

(22) Filed: Jul. 19, 2018

(65) Prior Publication Data

US 2019/0090592 A1   Mar. 28, 2019

(30) Foreign Application Priority Data

Sep. 26, 2017   (TW) .............................. 106132916 A

(51) Int. Cl.
| | | |
|---|---|---|
| *A43D 25/18* | (2006.01) | |
| *B05C 1/00* | (2006.01) | |
| *B05C 1/08* | (2006.01) | |
| *B32B 37/12* | (2006.01) | |

(52) U.S. Cl.
CPC ............ *A43D 25/181* (2013.01); *B05C 1/006* (2013.01); *B05C 1/0808* (2013.01); *B32B 37/1284* (2013.01); *Y10S 118/15* (2013.01); *Y10T 156/1798* (2015.01)

(58) Field of Classification Search
CPC .. A43D 25/181; A43D 25/183; B05C 1/0808; B05C 1/006; B05C 1/02; B32B 37/1284; Y10T 156/1798; Y10S 118/15; B65C 9/22; B65C 9/2247; B44C 7/04

USPC .......................... 118/304, 256, 264; 156/578
See application file for complete search history.

(56) References Cited

U.S. PATENT DOCUMENTS

| | | | | | |
|---|---|---|---|---|---|
| 2,638,073 | A | * | 5/1953 | Carter | ....................... B65C 9/22 |
| | | | | | 118/244 |
| 3,695,534 | A | * | 10/1972 | Treise | ...................... G03D 3/13 |
| | | | | | 242/364.3 |

FOREIGN PATENT DOCUMENTS

| | | |
|---|---|---|
| CN | 202962768 U | 6/2013 |
| CN | 103418524 B | 9/2015 |
| JP | S6148087 | 3/1986 |
| JP | 2003266018 A | 9/2003 |
| JP | 2007117973 A | 5/2007 |

(Continued)

OTHER PUBLICATIONS

English Machine Translation of CN 103418524 A (Di et al), published Dec. 4, 2013 (Year: 2013).*

(Continued)

*Primary Examiner* — Laura Edwards
(74) *Attorney, Agent, or Firm* — MLO, a professional corp.

(57) ABSTRACT

An adhesive applicator includes an actuation axle, a first hub unit, a second hub unit, a plurality of elastic members, and a pliable dispenser web. The first and second hub units are mounted on the actuation axle to be spaced apart from each other, and to rotate with the actuation axle about a rotation axis. Each of the elastic members is disposed between the first and second hub units, and has a radial elastic force relative to the rotation axis. The pliable dispenser web is configured to wrap around the elastic members, and can be deformed in compliance with a topology of an attachment region of a shoe component against the radial elastic force.

8 Claims, 4 Drawing Sheets

(56) References Cited

FOREIGN PATENT DOCUMENTS

WO    2016066114 A1    5/2016

OTHER PUBLICATIONS

English Machine Translation of WO 2016/066114 A1 (Yucheng), published May 6, 2016 (Year: 2016).*
Search Report appended to an Office Action, which was issued to Taiwanese counterpart application No. 106132916 by the TIPO dated Jun. 19, 2018, with an English translation thereof.
Office Action, which was issued to Japanese counterpart application No. 2018-150397 by the JPO dated Sep. 3, 2019. English translation—see Global Dossier.

* cited by examiner

ADHESIVE APPLICATOR

CROSS-REFERENCE TO RELATED APPLICATION

This application claims priority from Taiwanese invention patent application no. 106132916, filed on Sep. 26, 2017.

FIELD

The disclosure relates to an adhesive applicator, more particularly to an adhesive applicator for applying an adhesive to an attachment region of a shoe component.

BACKGROUND

A conventional device for applying an adhesive to a shoe component may include a rotation axle and a plurality of roller members. The rotation axle is mounted to be rotatable about a central axis of the rotation axle. The roller members are mounted on the rotation axle to rotate with the rotation axle about the central axis, and are displaced from each other about the central axis. Each of the roller members is rotatable relative to the rotation axle about its axis parallel to the central axis, and is configured for an adhesive to be spread thereon. During rotation of the rotation axle, an attachment region of the shoe component may be manually brought into pressing engagement with the roller members to permit the adhesive to be applied on the attachment region.

The roller members are normally made from a hard material for efficiently applying the adhesive to the attachment region of the shoe component, and are less likely to deform in compliance with a topology of the attachment region of the shoe component. Therefore, the attachment region may not be evenly applied with the adhesive.

In addition, Chinese utility model patent publication no. CN 202962768 U discloses another conventional device for applying an adhesive to a shoe component.

SUMMARY

Therefore, an object of the disclosure is to provide a novel adhesive applicator for applying an adhesive to an attachment region of a shoe component, by which the attachment region of the shoe component may be evenly applied with the adhesive.

According to the disclosure, an adhesive applicator for applying an adhesive to an attachment region of a shoe component is provided. The adhesive applicator includes an actuation axle, a first hub unit, a second hub unit, a plurality of elastic members, and a pliable dispenser web for an adhesive to be spread thereon. The actuation axle is mounted to be rotatable about a rotation axis, and extends along the rotation axis to terminate at a first end segment and a second end segment. The first hub unit includes a first hub body and a first annular flange. The first hub body is mounted on the first end segment to rotate with the actuation axle about the rotation axis. The first annular flange extends from the first hub body in radial directions to terminate at a first marginal portion. The second hub unit includes a second hub body and a second annular flange. The second hub body is mounted on the second end segment to rotate with the actuation axle about the rotation axis. The second annular flange extends from the second hub body in radial directions to terminate at a second marginal portion. Each of the elastic members extends along a lengthwise axis to terminate at a first end region and a second end region, and is stretchable lengthwise so as to have a radial elastic force relative to the lengthwise axis. The elastic members are angularly displaced from each other in a circumferential direction about the rotation axis. The first and second end regions are configured to be in frictional engagement with the first and second marginal portions, respectively, so as to permit the elastic members to rotate with the first and second hub units about the rotation axis. The pliable dispenser web extends in the circumferential direction, and is configured to wrap around the elastic members to rotate with the elastic members about the rotation axis, such that in response to a pressing engagement which is kept between the attachment region of the shoe component and an outer surface of the pliable dispenser web against the radial elastic force during rotation of the pliable dispenser web, the pliable dispenser web is deformed in compliance with a topology of the attachment region, thereby allowing the spread adhesive to be continuously and evenly applied to the attachment region.

BRIEF DESCRIPTION OF THE DRAWINGS

Other features and advantages of the disclosure will become apparent in the following detailed description of the embodiment (s) with reference to the accompanying drawings, in which.

DETAILED DESCRIPTION

Figure 1:
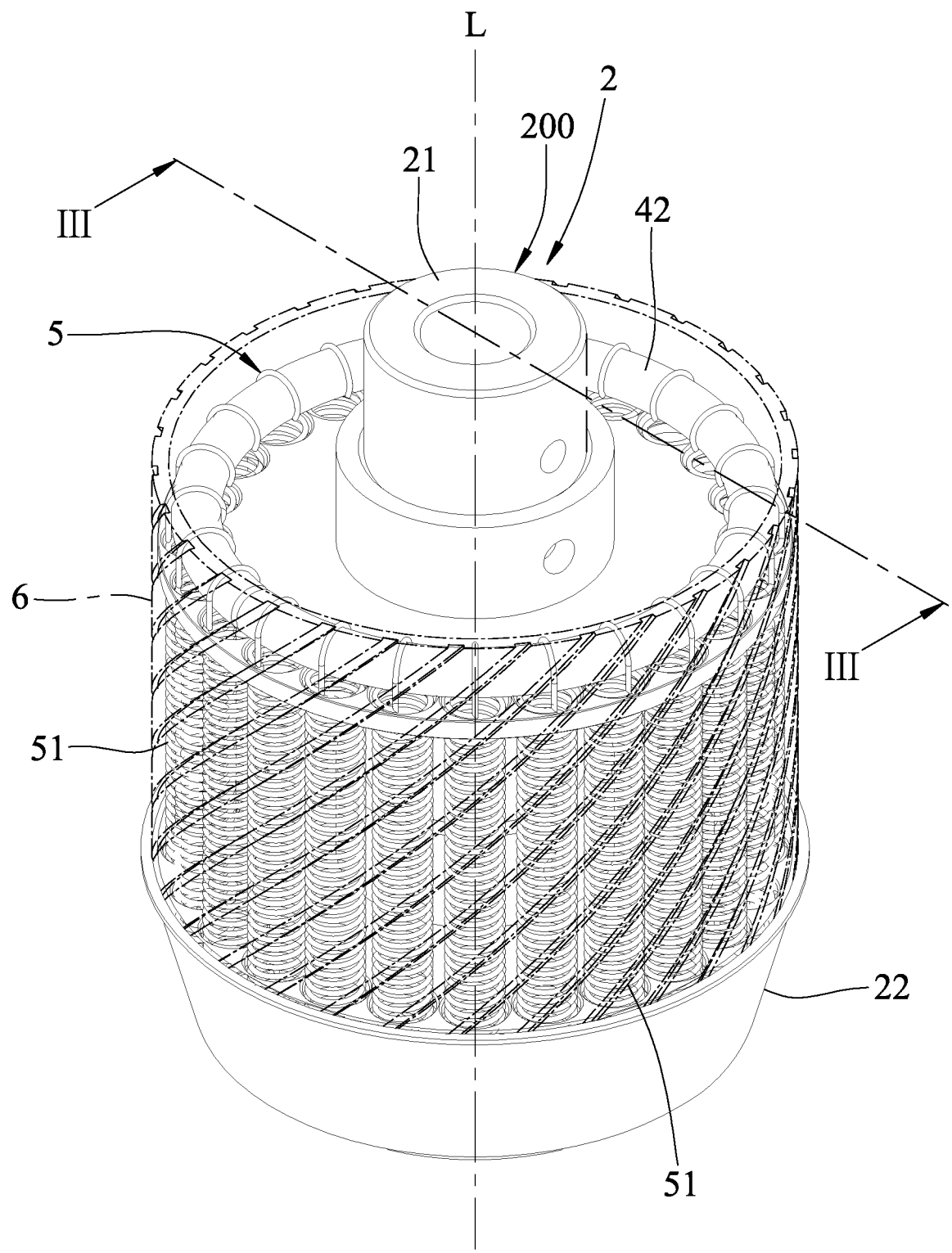
FIG. 1 is a perspective view of an adhesive applicator according to an embodiment the disclosure.

Referring to FIGS. 1 to 4, an adhesive applicator according to an embodiment of the disclosure is shown to include a positioning mechanism 200, an elastic unit 5, and a pliable dispenser web 6. The adhesive applicator is used for applying an adhesive to an attachment region 91 of a shoe component 9. The shoe component 9 may be, for example, a shoe sole.

The positioning mechanism 200 is mounted to be rotatable about a rotation axis (L), and includes an actuation unit 2, a first or lower hub unit 31, and a second or upper hub unit 41.

The actuation unit 2 includes an actuation axle 21 which is mounted to be rotatable about the rotation axis (L), and which extends along the rotation axis (L) to terminate at a first or lower end segment 211 and a second or upper end segment 212.

In an embodiment, the second end segment 212 may be coupled to and driven by a motor (not shown) to permit the actuation axle 21 to rotate about the rotation axis (L).

The first hub unit 31 includes a first hub body 311 and a first annular flange 312. The first hub body 311 is mounted on the first end segment 211 to rotate with the actuation axle 21 about the rotation axis (L). The first annular flange 312 extends from the first hub body 311 in radial directions to terminate at a first marginal portion 313.

Figure 2:
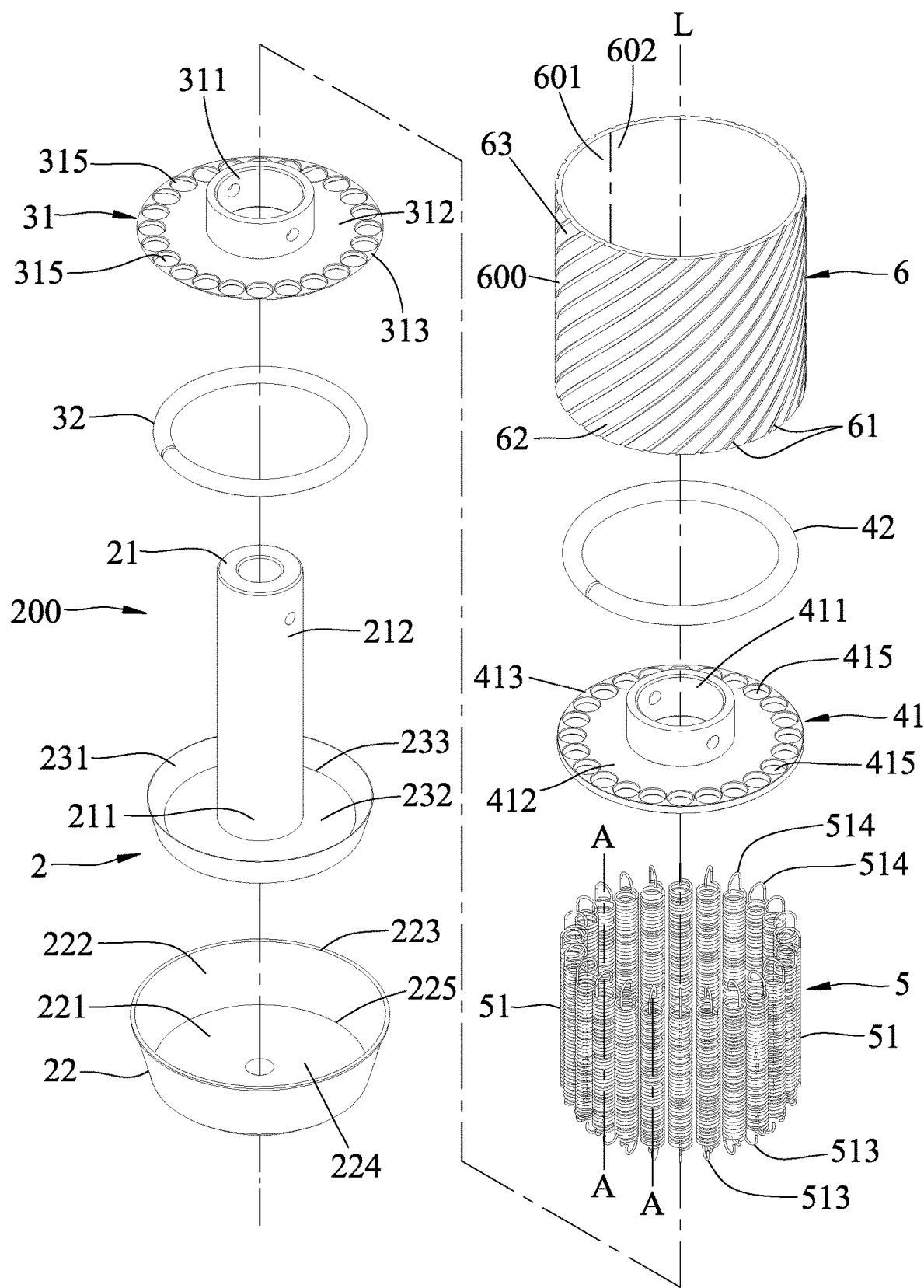
FIG. 2 is an exploded perspective view of the adhesive applicator.
Figure 3:
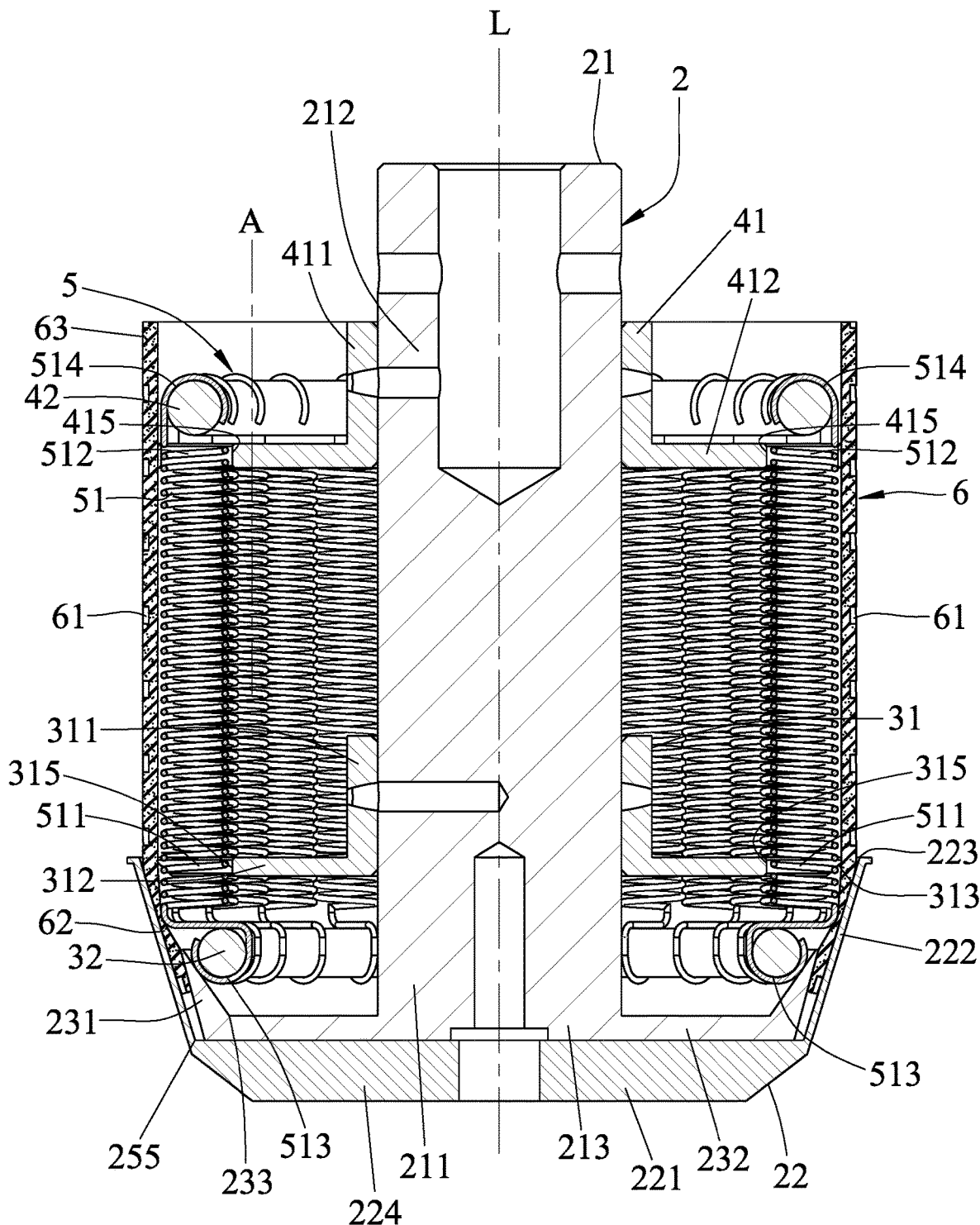
FIG. 3 is a cross-sectional view taken along line III-III in FIG. 1.

In an embodiment, as shown in FIGS. 2 and 3, the first marginal portion 313 is formed with a plurality of first through holes 315 which are displaced from each other about the rotation axis (L).

The second hub unit 41 is mounted on the actuation axle 21 to be spaced apart from the first hub unit 31 in a direction of the rotation axis (L), and includes a second hub body 411 and a second annular flange 412. The second hub body 411 is mounted on the second end segment 212 to rotate with the actuation axle 21 about the rotation axis (L). The second annular flange 412 extends from the second hub body 411 in radial directions to terminate at a second marginal portion 413.

In an embodiment, as shown in FIGS. 2 and 3, the second marginal portion 413 of the second annular flange 412 is formed with a plurality of second through holes 415 which are displaced from each other about the rotation axis (L).

The elastic unit 5 includes a plurality of elastic members 51 each of which extends along a lengthwise axis (A) in the direction of the rotation axis (L) to terminate at a first end region 511 and a second end region 512 (see FIG. 3), and each of which is stretchable lengthwise so as to have a radial elastic force (a radial biasing force) relative to the lengthwise axis (A). The elastic members 51 are angularly displaced from each other in a circumferential direction about the rotation axis (L). The first and second end regions 511, 512 are configured to be in frictional engagement with the first and second marginal portions 313, 413 (see FIG. 2), respectively, so as to permit the elastic members 51 to rotate with the first and second hub units 31, 41 about the rotation axis (L).

In an embodiment, as shown in FIGS. 2 and 3, the first end regions 511 of the elastic members 51 are frictionally engaged in the first through holes 315, respectively, and the second end regions 512 of the elastic members 51 are frictionally engaged in the second through holes 415, respectively.

In an embodiment, each of the elastic members 51 is a coil spring.

In an embodiment, as shown in FIGS. 2 and 3, the elastic unit 5 further includes a plurality of first extensions 513 and a plurality of second extensions 514. Each of the first extensions 513 is configured to extend from the first end region 511 of a corresponding one of the elastic members 51 outwardly of the first annular flange 312. Each of the second extensions 514 is configured to extend from the second end region 512 of a corresponding one of the elastic members 51 outwardly of the second annular flange 412.

In an embodiment, each of the first and second extensions 513, 514 is in a hook shaped.

Figure 4:
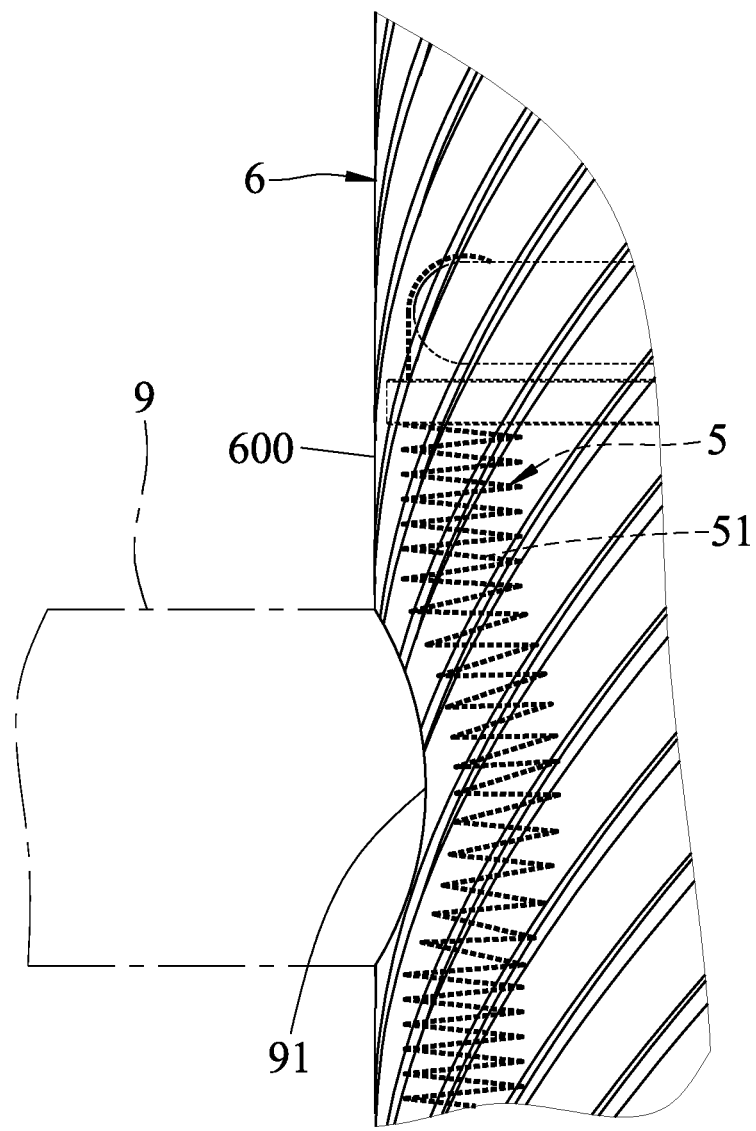
FIG. 4 is a fragmentary enlarged schematic view illustrating that a pliable dispenser web of the adhesive applicator is deformed in compliance with a topology of an attachment region of a shoe component.

The pliable dispenser web 6 is functioned for an adhesive to be spread thereon. The pliable dispenser web 6 extends in the circumferential direction to terminate at two ends 601, 602, and is configured to wrap around the elastic members 51 to rotate with the elastic members 51 about the rotation axis (L). As shown in FIGS. 3 and 4, in response to a pressing engagement which is kept manually between the attachment region 91 of the shoe component 9 and an outer surface 600 of the pliable dispenser web 6 against the radial elastic force during rotation of the pliable dispenser web 6, the pliable dispenser web 6 is deformed in compliance with a topology of the attachment region 91, thereby allowing the spread adhesive to be continuously and evenly applied to the attachment region 91.

Once the shoe component 9 is removed from the pliable dispenser web 6, the pliable dispenser web 6 will return to its original shape by virtue of the radial elastic force.

In addition, as shown in FIGS. 2 and 3, the pliable dispenser web 6 has a first annular marginal region 62 and a second annular marginal region 63 which are in proximity to the first and second hub units 31, 41, respectively.

Besides, the adhesive may be spread on the outer surface 600 of the pliable dispenser web 6 using an adhesive spray gun (not shown).

In an embodiment, as shown in FIG. 2, the two ends 601, 602 of the pliable dispenser web 6 are integrally joined to each other so as to render the pliable dispenser web 6 cylindrical.

In an embodiment, the outer surface 600 of the pliable dispenser web 6 is formed with a plurality of inclined grooves 61 relative to the rotation axis (L), for increasing an amount of the spread adhesive on the outer surface 600 of the pliable dispenser web 6.

In an embodiment, the pliable dispenser web 6 may be made from a nature rubber material, which is elastic and has a good wear resistance. In other embodiment, the pliable dispenser web 6 may be made from other materials with similar properties, such as a silicon rubber material, a plastic material with good solvent resistance and wear resistance, etc.

In an embodiment, as shown in FIGS. 2 and 3, the adhesive applicator further includes a first or lower anchor loop 32 and a second or upper anchor loop 42.

The first anchor loop 32 extends about the rotation axis (L), and is disposed on the first annular flange 312 so as to permit the first extensions 513 to be anchored thereon.

The second anchor loop 42 extends about the rotation axis (L), and is disposed on the second annular flange 412 so as to permit the second extensions 514 to be anchored thereon. In an embodiment, the second anchor loop 42 has an outer diameter slightly larger than that of the first anchor loop 32.

With the provision of the first and second anchor loops 32, 42, and the provision of the first and second through holes 315, 415, the elastic members 51 are less likely to shift from their original positions after using for a time period.

In an embodiment, the adhesive applicator further includes an end flange 232, an inner skirt 231, and an outer cap 22.

The end flange 232 extends from an end 213 of the first end segment 211 of the actuation axle 21 in radial directions to terminate at an annular edge 233.

The inner skirt 231 extends from the annular edge 233 toward the first marginal portion 313.

In an embodiment, as shown in FIGS. 2 and 3, the end flange 232, the inner skirt 231, and the actuation axle 21 are integrally formed, and the inner skirt 231 is flared from the annular edge 233 for receiving therein at least a portion of the first anchor loop 32.

The outer cap 22 includes a base 221 and an outer skirt 222. The base 221 has a central area 224 and a peripheral edge 225 surrounding the central area 224. The central area 224 is detachably secured to the end 213 of the first end segment 211 of the actuation axle 21. The outer skirt 222 extends from the peripheral edge 225, and is configured such that when the base 221 is secured to the end 213 of the first end segment 211 of the actuation axle 21, the first annular marginal region 62 of the pliable dispenser web 6 is sandwiched between the inner and outer skirts 231, 222. When the outer cap 22 is removed from the actuation axle 21, the pliable dispenser web 6 may be replaced by a new one.

In an embodiment, a fastener (not shown) extending along the rotation axis (L) may be disposed to pass through the central area 224 to be secured to the end 213 of the first end segment 211 of the actuation axle 21, thereby securing the base 221 to the actuation axle 21.

In an embodiment, as shown in FIGS. 2 and 3, the outer skirt 222 is flared from the peripheral edge 225 to terminate at an abutment end 223 for fittingly receiving therein the first annular flange 312, together with the first annular marginal region 62 of the pliable dispenser web 6. The abutment end 223 may be configured to abut against the pliable dispenser web 6. The abutment end 223 may further extend radially and outwardly to prevent the spread adhesive from falling off.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An adhesive applicator for applying an adhesive to an attachment region of a shoe component, said adhesive applicator comprising:
    an actuation axle which is mounted to be rotatable about a rotation axis, and which extends along the rotation axis to terminate at a first end segment and a second end segment;
    a first hub unit including
        a first hub body mounted on said first end segment to rotate with said actuation axle about the rotation axis, and
        a first annular flange extending from said first hub body in radial directions to terminate at a first marginal portion;
    a second hub unit including
        a second hub body mounted on said second end segment to rotate with said actuation axle about the rotation axis, and
        a second annular flange extending from said second hub body in radial directions to terminate at a second marginal portion;
    a plurality of elastic springs each of which extends along a lengthwise axis to terminate at a first end region and a second end region, and each of which is stretchable lengthwise so as to have a radial elastic force relative to the lengthwise axis, said elastic springs being angularly displaced from each other in a circumferential direction about the rotation axis, said first and second end regions being configured to be coupled to said first and second marginal portions, respectively, so as to permit said elastic springs to rotate with said first and second hub units about the rotation axis; and
    a pliable dispenser web for an adhesive to be spread thereon, which extends in the circumferential direction, and which is configured to wrap around said elastic springs to rotate with said elastic springs about the rotation axis, such that in response to a pressing engagement which is kept between the attachment region of the shoe component and an outer surface of said pliable dispenser web against the radial elastic force during rotation of said pliable dispenser web, said pliable dispenser web is deformed in compliance with a topology of the attachment region, thereby allowing the spread adhesive to be continuously and evenly applied to the attachment region.

2. The adhesive applicator according to claim 1, wherein said pliable dispenser web extends in the circumferential direction to terminate at two ends which are integrally joined to each other so as to render said pliable dispenser web cylindrical.

3. The adhesive applicator according to claim 2, wherein said first marginal portion is formed with a plurality of first through holes which are displaced from each other about the rotation axis, and which are configured to permit said first end regions of said elastic springs to be coupled in said first through holes, respectively, and
said second marginal portion is formed with a plurality of second through holes which are displaced from each other about the rotation axis, and which are configured to permit said second end regions of said elastic springs to be coupled in said second through holes, respectively.

4. The adhesive applicator according to claim 3, further comprising:
    a plurality of first extensions each of which is configured to extend from said first end region of a corresponding one of said elastic springs through a respective one of said first through holes to be disposed outwardly of said first annular flange;
    a plurality of second extensions each of which is configured to extend from said second end region of a corresponding one of said elastic springs through a respective one of said second through holes to be disposed outwardly of said second annular flange;
    a first anchor loop extending about the rotation axis, and disposed on said first annular flange so as to permit said first extensions to be anchored thereon; and
    a second anchor loop extending about the rotation axis, and disposed on said second annular flange so as to permit said second extensions to be anchored thereon.

5. The adhesive applicator according to claim 4, wherein said pliable dispenser web has a first annular marginal region and a second annular marginal region which are in proximity to said first and second hub units, respectively, said adhesive applicator further comprising:
    an end flange extending from an end of said first end segment of said actuation axle in radial directions to terminate at an annular edge;
    an inner skirt extending from said annular edge toward said first marginal portion; and
    an outer cap including
        a base having a central area and a peripheral edge surrounding said central area, said central area being detachably secured to said end of said first end segment of said actuation axle, and
        an outer skirt extending from said peripheral edge, and configured such that when said base is secured to said end of said first end segment of said actuation axle, said first annular marginal region of said pliable dispenser web is sandwiched between said inner and outer skirts.

6. The adhesive applicator according to claim 5, wherein said outer surface of said pliable dispenser web is formed with a plurality of inclined grooves relative to the rotation axis, for increasing an amount of the spread adhesive on said outer surface of said pliable dispenser web.

7. The adhesive applicator according to claim 6, wherein said inner skirt is flared from said annular edge, and said outer skirt is flared from said peripheral edge.

8. The adhesive applicator according to claim 1, wherein each of said elastic springs is a coil spring.

* * * * *